Dec. 11, 1934.  J. S. SHARPE  1,984,235
TRANSMISSION MECHANISM
Filed Nov. 8, 1933  2 Sheets-Sheet 2

Inventor:-
John S. Sharpe
by his Attorneys
Howson & Howson

Patented Dec. 11, 1934

1,984,235

UNITED STATES PATENT OFFICE 1,984,235

TRANSMISSION MECHANISM

John S. Sharpe, Haverford, Pa.

Application November 8, 1933, Serial No. 697,178

8 Claims. (Cl. 74—282)

The principal object of this invention is to provide a novel variable transmission mechanism suitable for use in motor vehicles which shall be characterized by relative simplicity of form and operation, which shall be relatively free from noise, and which avoids the necessity for meshing and unmeshing gears in the operation of varying the speed and torque ratios of the driving and driven members.

Figure 1:
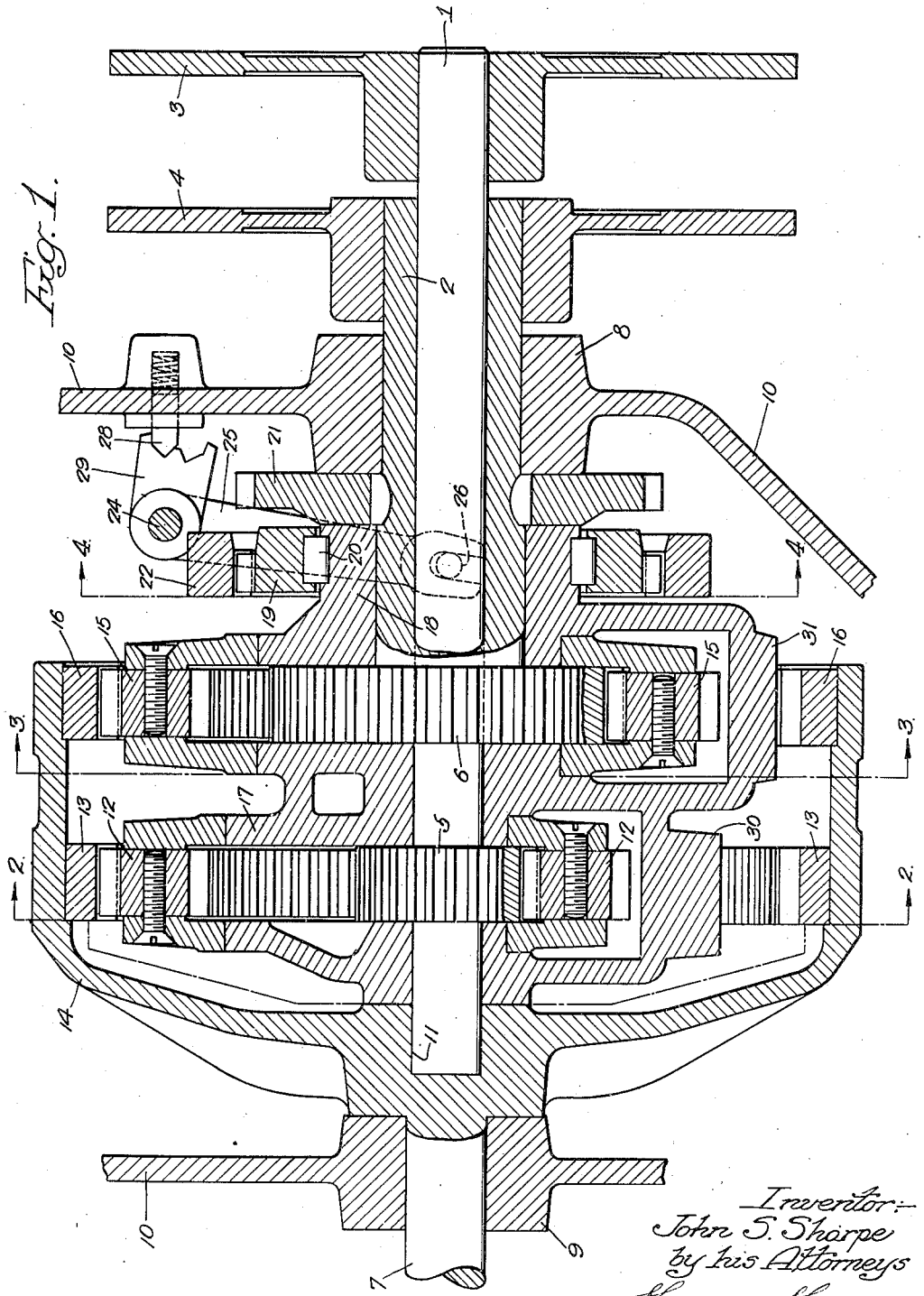
Figure 2:
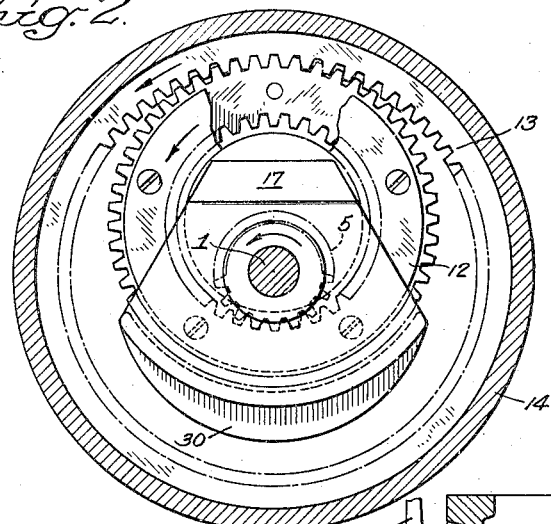
Figure 5:
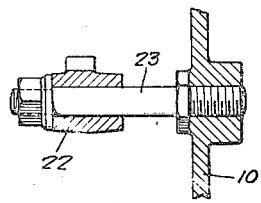
Figure 4:
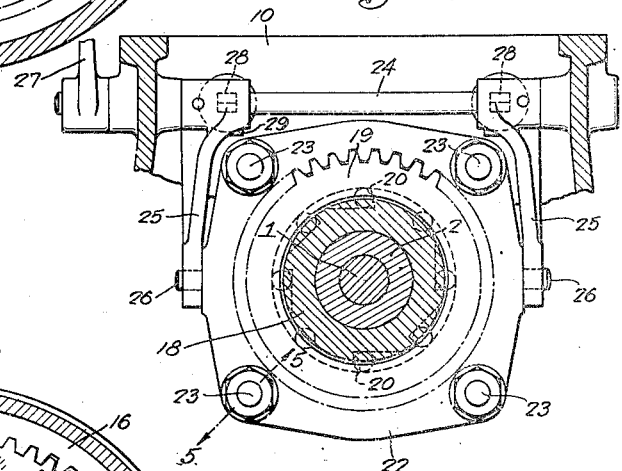
Figure 3:
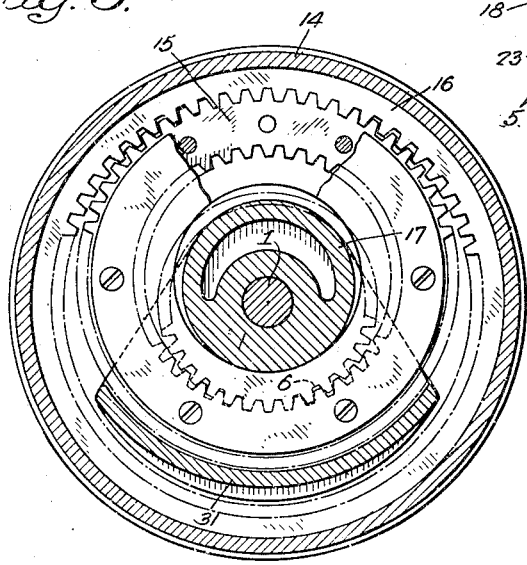

In the attached drawings:

Figure 1 is a longitudinal sectional view of a transmission made in accordance with my invention;

Figs. 2, 3 and 4 are, respectively, sections on the lines 2—2, 3—3 and 4—4, Fig. 1, and Fig. 5 is a fragmentary section on the line 5—5, Fig. 4.

With reference to Fig. 1 of the drawings, the transmission therein illustrated comprises in effect two driving shafts 1 and 2, these shafts being coaxially arranged, with the shaft 1 extending through the hollow shaft 2. Each of these shafts carries at its outer end a clutch, 3 and 4, respectively, by means of which the shafts may be selectively or jointly connected to the source of power. Each of the shafts carries at its inner end a pinion, 5 and 6 respectively, and each of these pinions is connected through a gear train hereinafter described with a driven shaft 7. The shafts 1, 2 and 7 are journaled in bearings 8 and 9 provided in a casing 10, and it will be noted that the inner end of the shaft 1 is journaled at 11 in the inner end of the driven shaft 7.

The pinion 5 meshes with the interior of a planetary internal-external gear 12, and the gear 12 in turn meshes externally with an internal gear 13 connected to the driven shaft 7 and carried in the present instance by the enlarged inner end portion 14 of that shaft. The pinion 6 meshes with the interior of a planetary internal-external gear 15, which in turn meshes externally with an internal gear 16 also carried by the enlarged portion 14 of the driven shaft 7. Each of the gears 12 and 15 is journaled eccentrically upon a rotary planetary carrier 17, this carrier being journaled upon the shafts 1 and 2. The pinions 5 and 6 and the gears 12 and 15 are so relatively proportioned as to afford variation in the speed and torque ratios between the driven shaft and the driving shafts 1 and 2, respectively.

Journaled for rotation upon the hub portion 18 of the planetary carrier 17 is an externally toothed member 19, and means is provided in the form of an overrunning clutch 20 for permitting relative rotation between the planetary carrier 17 and the member 19 in one direction only. The character of this overrunning clutch 20 is illustrated in Fig. 4. A second toothed member 21 is fixed, as shown in Fig. 1, to the driving shaft 2, and the toothed peripheries of the members 19 and 21 are arranged in proximity one to the other. Slidably mounted in the casing 10 and adapted in alternative positions to interlock with the members 19 and 21 respectively is an internally toothed clutch member 22. This member, as shown in Figs. 4 and 5, is slidably mounted on a plurality of studs 23 extending inwardly from the casing 10, and means is provided for shifting this clutch member 22 between the position in which it is shown in Fig. 1 engaging the teeth of the member 19 to the alternative position embracing and engaging the teeth of the member 21. The shifting means for the member 22, shown in Fig. 4, consists of a rock shaft 24 journaled in the casing and having depending arms 25, 25, with slots at their lower ends embracing trunnions 26, 26, at opposite sides of the member 22. The shaft 24 is rocked to shift the member 22 as described through the medium of a lever 27 secured to the outer projecting end of the shaft. Means is also provided, as shown in Fig. 1, for releasably maintaining the member 22 in either of the adjusted positions, this means consisting of spring-pressed detents 28 in the casing 10 which engage notches in segments 29 on the hubs of the arms 25.

The operation of the aforedescribed mechanism is as follows: Assuming that the clutch member 22 is in the position shown in Fig. 1 engaging the member 19, power applied to the shaft 1 through the medium of the clutch 3 to rotate the shaft and the pinion 5 in the direction indicated by the arrow in Fig. 2 tends to rotate the gear 12 on the planetary carrier 17 in the same direction and thereby to transmit torque also in the same direction to the internal gear 13, and through the member 14 to the driven shaft 7. Assuming a load on the driven shaft, there will be a tendency for the gear 12 to track on the internal gear 13 in the opposite direction carrying with it the planetary carrier 17. This tracking movement of the gear 12 on the internal gear 13 and the resultant movement of the planetary carrier 17 is prevented by the overrunning clutch 20 and the clutch element 22 which jointly immobilize the planetary carrier from movement in that direction while leaving it free from movement in the opposite direction. The planetary carrier thus immobilized constitutes in effect a fulcrum which imposes the entire turning force upon the internal gear 13 and the driven shaft 7 with which this gear is connected to thereby overcome the inertia of this shaft and the load applied thereto, and results in a rotation of the shaft in the same direction as the shaft 1. The pinion 5 and the gear 12 are so relatively designed that the torque ratio of the driving shaft 1 to the driven shaft 7 is relatively high, while the speed of rotation of the driven shaft 7 is low as compared with the speed of rotation of the driving shaft 1.

To increase the speed of the driven shaft, the clutch 3 is now disengaged and the clutch 4 engaged, thereby connecting the shaft 2 with the source of power and disconnecting the shaft 1. The same sequence of events now occurs through the gear train consisting of the pinion 6, the gear 15 and the internal gear 16.

If now it is desired to still further increase the speed of the driven shaft, the clutches 3 and 4 may be engaged simultaneously, with the result that with both of the shafts 1 and 2 connected to the source of power and by reason of the differences in the gears connected to these two shafts, the entire system is locked together and rotates as a unit, the effect being that of a direct coupling between the shafts 1 and 2 and the driven shaft 7.

A reversal of the direction of rotation of the driven shaft 7 may be effected by shifting the clutch member 22 to the alternative position engaging the member 21. This in effect immobilizes the shaft 2. Rotation of the shaft 1 and of the pinion 5 as before in the direction of the arrow in Fig. 2, will tend, by reason of the fact that the load is applied to the shaft 7, to cause the gear 12 to track around the internal gear 13 in a direction which is the reverse of the direction of rotation of the pinion 5. This tracking of the gear 12 on the internal gear 13 is now possible by reason of the disengagement of the clutch member 22 from the member 19, which frees this member for movement with the planetary carrier 17 when the latter is moved with the gear 12 in its reverse rotation. This movement of the planetary carrier 17 effects a corresponding movement of the gear 15, which now tracks around the relatively fixed gear 6 and carries with it in the same reverse direction the internal gear 16, which as previously set forth is connected to the shaft 7. It will be noted that this reverse movement of the driven shaft 7 is at relatively low speed.

Since the eccentric mounting of the ring gears 12 and 15 would tend at the higher speeds to set up an undesirable moment in the mechanism, this eccentricity is counterbalanced by weights applied through the medium of the planetary carrier 17, this member being formed in effect with counterbalance weights 30 and 31, see Figs. 1, 2 and 3, which provide the necessary dynamic balance.

While I have illustrated my invention as applied to what might be termed a "three speed variable transmission", it will be apparent that the invention in principle is applicable to transmissions of a higher degree of variability employing more than two driving shafts, with means for connecting the individual shafts to the source of power. There may also be considerable modification in the details of construction from the more or less diagrammatic illustration shown in the drawings.

I claim:

1. A transmission mechanism comprising a driven member, internal gear means connected to said driven member, a planetary carrier, a plurality of internal-external gears eccentrically journaled on said carrier and meshing with said internal gear means, a plurality of driving members each having a pinion, said pinions meshing respectively with the interiors of said internal-external gears, means for independently connecting the driving members with a source of power, and means for controlling the rotation of said carrier.

2. A transmission mechanism comprising a driven member, a plurality of independent driving members each having an operative connection with the driven member, said connections each comprising an internal-external gear, an internal gear on the driven member with which said internal-external gear meshes, and a pinion meshing internally with said internal-external gear, a common rotary carrier for said internal-external gears upon which said internal-external gears are eccentrically journaled for planetary movement within the associated internal gear, and means for controlling rotation of said carrier.

3. A transmission mechanism comprising a rotary driven member and a plurality of independently operative rotary driving members, transmission means connecting each of the driving members with the driven member, said means differing relatively to afford different speed and torque ratios between the driving members respectively and the driven member, and said transmission means comprising each a pinion connected to the driving member, an internal gear connected to the driven member, and a planetary internal-external gear interposed between the pinion and the internal gear and embracing said pinion, together with a rotary planetary carrier upon which both of said internal-external gears are eccentrically journaled, and means for controlling the rotation of said carrier.

4. A transmission mechanism comprising a rotary driven member and a plurality of independently operative rotary driving members, a planetary system connecting each of the driving members with the driven member, said systems differing relatively to afford different speed and torque ratios between the respective driving members and the driven member and each comprising an internal orbit gear connected with the driven member, a sun gear connected to the driving member, a planet gear in the form of an internal-external gear embracing and meshing internally with the sun gear and meshing externally with the orbit gear, and a rotary planetary carrier on which both of said internal-external gears are eccentrically journaled, and releasable means for controlling rotation of the said carrier and of one of the said sun gears.

5. A transmission mechanism comprising a rotary driven shaft and a plurality of independently operative rotary driving shafts, said shafts being coaxial one with the others, a planetary system connecting each of the driving shafts with the driven shaft, said systems differing relatively to afford different speed and torque ratios between the respective driving shafts and the driven shaft and each system comprising an internal orbit gear connected with the driven shaft, a sun gear connected to the driving shaft, a planet gear in the form of an internal-external gear embracing and meshing internally with the sun gear and meshing externally with the orbit gear, and a rotary planetary carrier journaled for rotation coaxially with the driving and driven shafts and on which both of said internal-external gears are eccentrically journaled, and releasable means for controlling rotation of the said carrier and of one of said sun gears.

6. A transmission mechanism comprising a rotary driven shaft and a plurality of independently operative rotary driving shafts, said shafts being coaxial one with the others, a planetary system connecting each of the driving shafts with the driven shaft, said systems differing relatively to afford different speed and torque ratios between the respective driving shafts and the driven shaft and each system comprising an internal orbit gear connected with the driven shaft, a sun gear connected to the driving shaft, a planet gear in the form of an internal-external gear embracing and meshing internally with the sun gear and meshing externally with the orbit gear, and a rotary planetary carrier journaled for rotation coaxially with the driving and driven shafts and on which both of said internal-external gears are eccentrically journaled, releasable means for controlling rotation of the said carrier and of one of said sun gears, and counterbalance means associated with said carrier for balancing dynamically the eccentrically-journaled internal-external gears.

7. A transmission mechanism comprising a rotary driven member and a plurality of independently operative rotary driving members, a planetary system connecting each of the driving members with the driven member, said systems differing relatively to afford different speed and torque ratios between the respective driving members and the driven member and each comprising an internal orbit gear connected with the driven member, a sun gear connected to the driving member, a planet gear in the form of an internal-external gear embracing and meshing internally with the sun gear and meshing externally with the orbit gear, and a rotary planetary carrier on which both of said internal-external gears are eccentrically journaled, overrunning clutch means preventing rotation of the said carrier in one direction, while permitting said rotation in the opposite direction, means for controlling the operativeness of said clutch, and releasable means for immobilizing one of said sun gears.

8. A transmission mechanism comprising internal gear means, a planetary carrier, a plurality of internal-external gears eccentrically journaled on said carrier and meshing with said internal gear means, a pinion meshing with the interior of each of said internal-external gears, means for controlling the rotation of said carriers, a rotary terminal element connected to said internal gear means, a plurality of opposite terminal elements connected respectively to said pinions, and means for independently and selectively connecting the last-named terminal elements to external mechanism.

JOHN S. SHARPE.